Patented Oct. 8, 1929

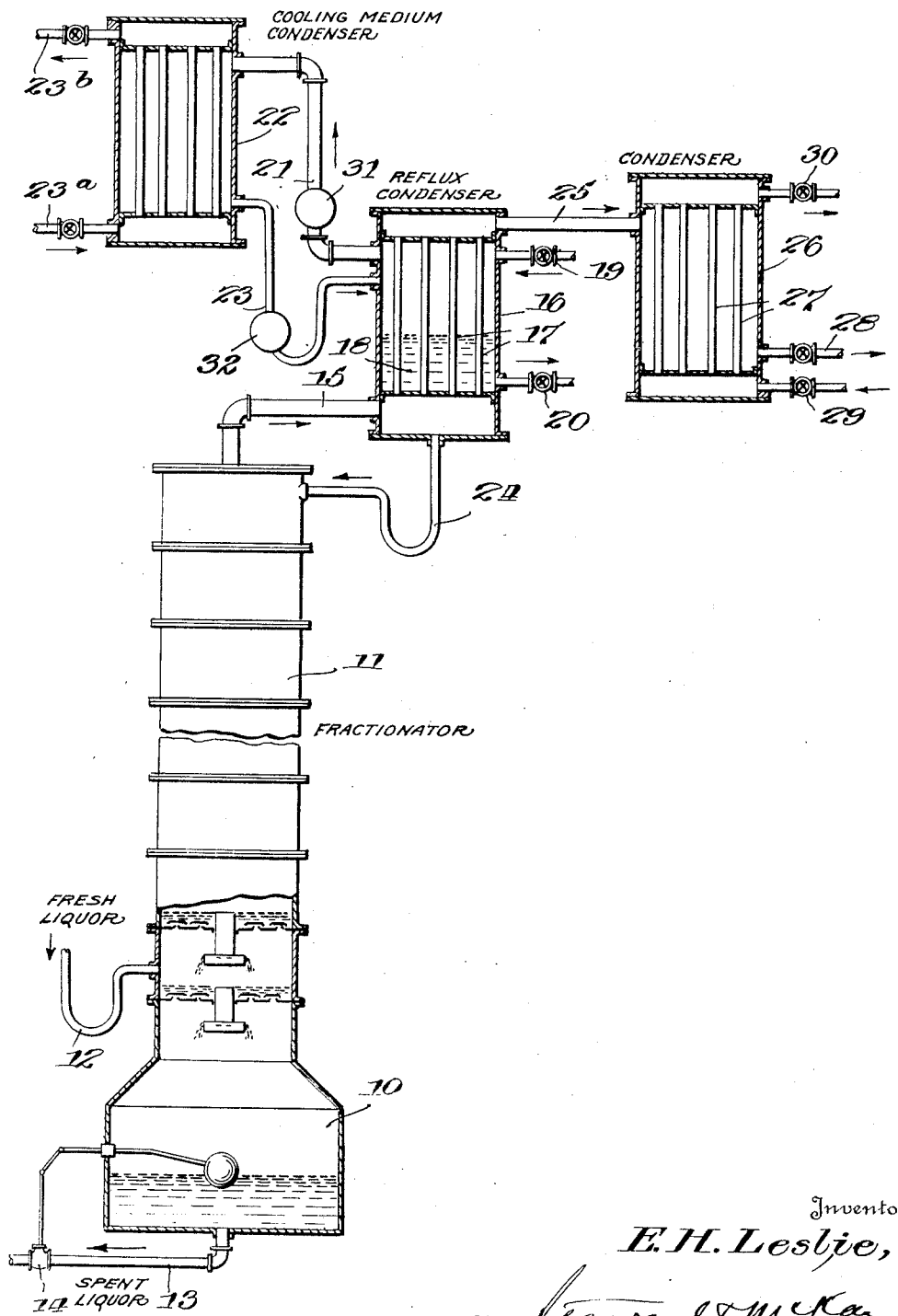

1,730,892

UNITED STATES PATENT OFFICE

EUGENE H. LESLIE, OF ANN ARBOR, MICHIGAN

ART OF DISTILLATION

Application filed April 19, 1923. Serial No. 633,296.

This invention relates to art of distillation; and it relates more particularly to a process of and apparatus for effecting distillation of liquid mixtures, wherein the liquid mixture to be distilled is heated in a suitable still or vaporizer, the resultant vapors are fractionated in any appropriate form of fractionating apparatus, a portion of the vapors from the fractionating apparatus are condensed and refluxed thereto, and the remaining vapors are then condensed to the final product of distillation, the transfer of heat from the saturated or superheated vapors undergoing reflux condensation in the reflux cooler or partial condenser being accurately and exactly controlled in a novel and advantageous manner.

In effecting more or less complete separation of a more volatile from a less volatile component of a liquid mixture, it is common practice to heat the liquid in a still or vaporizer and to pass the resultant vapors through fractionating apparatus of suitable type, such as a column, dephlegmator, or other appropriate apparatus whereby the composition of the vapors is changed in such manner that they become progressively richer in the more volatile component. It is essential that a portion of the vapor be condensed and returned to the top of the column, or other form of fractionating system employed, in order that the fractionating system may function properly, and this is true for both batch and continuous distillation. The quantity of liquid that necessarily must be so returned per unit weight of the final product or products obtained is mathematically related to the composition of the product or products, the composition and weight of the vapor entering the column or fractionator, and also, in continuous distillation, to the weights and compositions of the feed entering, and of the liquid residue leaving, the system. These relationships are conditioned by the inherent thermodynamic properties of the substances composing the liquid solution or mixture that is being distilled. Because of the definiteness of the relationships just mentioned, it is of great importance, if the process is to be most efficient, that the weight of reflux condensate be controlled with as much precision as is reasonably possible in commercial practice. The importance of this factor does not appear to have been fully appreciated heretofore, nor has provision been made whereby such control can be attained with anything like the precision necessary for most satisfactory and dependable operation of a distillation system. It is accordingly a principal object of the present invention to provide a method and an apparatus whereby control of the heat transfer in the reflux operation, and hence the quantity of the reflux condensate returned to the fractionating system, may be controlled with precision and certainty.

In the practice of the present invention, the cooling medium employed in the reflux cooler or partial condenser is one that boils, under the conditions of operation, at a temperature below the boiling point of the liquid in equilibrium with the vapors exiting from the reflux device; and the conditions of operation are such that such lower-boiling cooling medium is maintained constantly boiling. In other words, the cooling medium is continuously converted into vapor at the particular pressure prevailing, and in undergoing this change of state each unit weight of the cooling liquid that is vaporized absorbs from the vapors conducted into the reflux unit a definite quantity of heat, that is, the latent heat of vaporization of the substance, solution, or mixture, used as the cooling medium. Suitable provision is made to guard against change in composition of the cooling medium; and its effective action as a heat-absorbent may be exactly adjusted in accordance with requirement by providing suitable means for varying either the conditions under which the cooling medium boils or the heat-transferring relation between it and the vapors of the distilled liquid. One way of effecting such adjustment is to vary the quantity of the cooling medium in contact with the heat-transferring surface of the reflux unit as may be necessary to obtain the exact degree of heat transference desired. Another method is to vary the pressure upon the cooling medium and hence the temperature at which it boils.

The underlying principles of the invention can be further explained to advantage by way of a concrete example illustrating one practical embodiment of the process and of apparatus suitable for carrying it into effect. Such an illustrative embodiment of apparatus is shown in the accompanying drawing which illustrates more or less diagrammatically a distillation system of the character here in question, the view being in side elevation, partly broken away and in section.

Referring to the drawing, 10 is a still or vaporizer, and 11 is a fractionator of any appropriate type, in this instance a still column of known construction. At 12 is the feed, and at 13 is the discharge for spent liquor, the discharge being automatically governed by the float-controlled valve 14, the particular system here illustrated being adapted for continuous distillation. Vapors leaving the fractionating column through pipe 15 enter the reflux cooler or partial condenser 16, passing upwards through tubes 17 which are surrounded by a heat-absorbing liquid medium 18 of the character hereinabove mentioned. A valved pipe 19 permits introduction of said cooling medium into the space surrounding the pipes 17, while valved pipe 20 provides for withdrawing said medium when it is desired to adjust the level of the medium 18, the area of the tubes wetted by said medium being thus altered and the cooling effect of such medium thereby adjusted. Vapors evolved in the boiling of the cooling medium 18 are totally condensed and returned to the body of said liquid in the reflux unit. This is accomplished in the present instance by passing vapors of said cooling medium through pipe 21 to tubular condenser 22, the condensate flowing back through pipe 23. Said condenser is provided with inflow and outflow pipes 23$^a$ and 23$^b$ for the medium, ordinarily water, used to cool its condensing surfaces. An adjustable pressure reducing valve 31 is provided in the pipe 21 to enable the pressure of the vapor of the cooling medium 18 in the reflux cooler 16 to be regulated independently of the pressure of the vapor of such cooling medium in the condenser 22. A non-return valve 32 is arranged in the condensate return pipe 23 and the pipe 23 is made high enough to provide a hydrostatic head sufficient to overcome any desired excess in vapor pressure in the cooler 16 over that in the condenser 22.

Such predeterminable portion of the distillation vapors entering the reflux unit 16 through pipe 15, as is condensed by the cooling action of the boiling medium 18, is refluxed to the top section of the distilling column 11 through pipe 24. Vapors escaping condensation in reflux 16 exit through pipe 25 and enter condenser 26, being condensed therein by the cooling effect of the cooling medium flowing through pipes 27, and the resultant condensate, which is the final product, being discharged through valved pipe 28. The condenser is provided with the usual inflow and outflow pipes 29 and 30 for cooling medium.

It is to be understood that in carrying out the process of the invention in the above described apparatus, the amount of cooling medium 18 in the reflux 16 or the pressure thereon, the rate of distillation, and any other necessary conditions of operation, are so adjusted that said cooling medium 18 boils continuously, thus abstracting from the hot distillation vapors a definitely predeterminable quantity of heat corresponding to the weight of vapor formed from, and to the latent heat of, vaporization of the liquid cooling medium at the pressure prevailing in the cooling space of the reflux. This ensures the return of an exactly controllable weight of reflux condensate to the top of the column 11 and accordingly enables the whole distilling operation to be controlled with precision and certainty.

Changing the level of the cooling medium 18 in the reflux is to be understood as only typical of various expedients that may be used to effect control and fine adjustment of the quantity of heat transferred in the reflux unit. Such adjustment or control may be effected otherwise as above pointed out as, for example, by varying the pressure on the cooling medium by adjusting the pressure reducing valve 31. Or the mean temperature difference between the distillation vapors and the cooling medium can be changed by using liquids of different boiling points as cooling media. The greater this temperature difference, the larger the quantity of heat transferred to the cooling medium from the vapor. It is also feasible to use cooling mixtures of two or more different liquids in various proportions, thus making it possible to give any desired or required value to the mean temperature difference.

From the standpoint of economy in installation and operation, it is usually desirable to employ a cooling medium whose boiling point is very much lower than that of the liquid in equilibrium with the vapors exiting from the reflux unit, because under these circumstances the transfer of heat is very rapid and consequently a comparatively small and inexpensive reflux unit can be used.

Once the desired conditions are established, they are automatically maintained. The value of this certainty of control is obviously of great importance in the operation of apparatus for continuous distillation or fractionation.

In batch distillation the situation is somewhat different. As the distillation proceeds, the weight of the liquid necessarily returned to the top of the column or fractionator changes with the change in composition of the liquid in the still, or with the composition of the vapor entering the fractionating system. Accurate control of the heat-transfer in the reflux condenser is necessary, but the weight of reflux condensate must increase progressively. The most convenient way of effecting such control in accordance with the present invention, while providing for the progressive increase in weight of reflux condensate, is to utilize suitable means for automatically controlling the level of the cooling medium 18, or of progressively changing the total pressure on, and hence the boiling point of, the said liquid 18. The first method controls the area of the heat transferring surface, and the second the mean temperature difference between the distillation vapor and the cooling medium. Automatic means may also be provided for varying the pressure on the cooling medium as a function of the composition of the liquid in the still 10 or the vapor coming therefrom. Although automatic control is most convenient in practice for attaining the desired progressive increase in weight of reflux condensate, the necessary control can be effected by a still attendant who adjusts the apparatus from time to time in accordance with observations.

It is to be understood that, for the purposes of this invention, the reflux cooler or partial condenser 16, functions substantially only as heat-transferring apparatus, and that it is not intended to effect therein substantial change in the composition of the vapors entering same from the fractionating system. The function of said reflux 16 is therefore not to be confounded with that of fractionating apparatus, whether of the dephlegmator or fractional condenser type.

While certain embodiments of the novel process and apparatus have been hereinabove described by way of explanatory example for the sake of clearly disclosing the principles of the invention, it is to be understood that the invention is not restricted to said embodiments and that the scope of the invention is indicated in the appended claims.

What I claim is:

1. In the art of distillation, the process which comprises vaporizing a liquid to be distilled, treating the vapors in a fractionator, subjecting vapors leaving said fractionator to the action of a reflux cooler to partially condense the same for return to said fractionator, while controlling the heat exchange in said reflux cooler by employment therein of a liquid cooling medium that boils under the conditions of operation thereby enabling the return of an exactly predeterminable weight of said partial condensate to the fractionating system, and conducting away and condensing residual vapors from said reflux cooler.

2. In the art of distillation, the process which comprises vaporizing a liquid to be distilled and subjecting the vapors to fractionation, abstracting heat from the vapors resulting from fractionation by bringing such resultant vapors into heat-transferring relation with a cooling liquid of lower boiling point than the liquid in equilibrium with the vapors exiting from the heat-transferring means and thus partially condensing said vapors, the conditions being so controlled that such lower boiling liquid is maintained boiling thereby enabling the return of an exactly predeterminable weight of said partial condensate to the fractionating system, refluxing said resultant condensate to the fractionating system, and condensing the residual vapors to obtain a desired distillation product.

3. In the art of distillation, the process which comprises vaporizing the liquid to be distilled, fractionating the vapors, partially condensing vapors surviving such fractionation by the cooling action of a liquid medium of lower boiling point than that of the liquid in equilibrium with said partial condensate under conditions such that said medium continually boils thereby enabling the return of an exactly predeterminable weight of the partial condensate to the fractionating system, refluxing said partial condensate to said fractionating apparatus, and separately condensing the vapors escaping the partial condensation.

4. In the art of distillation, the process which comprises vaporizing the liquid to be distilled, fractionating the vapors, partially condensing the fractionated vapors in a reflux cooler by the action of a liquid cooling medium that is maintained boiling at a temperature below the boiling point of the liquid in equilibrium with the vapor exiting from the reflux cooler thereby enabling the return of an exactly predeterminable weight of the partial condensate to the fractionating system, refluxing said partial condensate to the fractionating stage, and further controlling the amount of the reflux condensate by adjusting the heat-exchange relation between said cooling medium and said fractionated vapors in the reflux cooler.

5. The process as defined in claim 4, wherein such further control of the amount of reflux condensate is effected by varying the effective area of the cooling surface of said reflux cooler.

6. The process as defined in claim 4, wherein such further control of the amount of reflux condensate is effected by varying the pressure upon the boiling cooling medium in the reflux cooler.

7. Distillation apparatus comprising the combination, with a vaporizing and fractionating system, of a reflux cooler connected thereto and into which vapors pass from said system, and a condensing system into which vapors pass from said cooler, said cooler being provided with separated spaces for distillation vapors and cooling fluid, respectively, means being also provided to condense vapors of the cooling fluid and return the condensate to the cooling fluid space of said cooler.

8. Distillation apparatus as defined in claim 7, further characterized by the provision of means for adjusting the cooling action of said reflux cooler.

9. Distillation apparatus as defined in claim 7, further characterized by the provision of means for varying the effective cooling surface area of said reflux cooler to adjust its cooling action.

In testimony whereof I hereunto affix my signature.

EUGENE H. LESLIE.